Dec. 6, 1949     G. SWAHNBERG     2,490,169
KNIFE STRUCTURE FOR LAWN MOWERS AND THE LIKE
Filed April 12, 1945
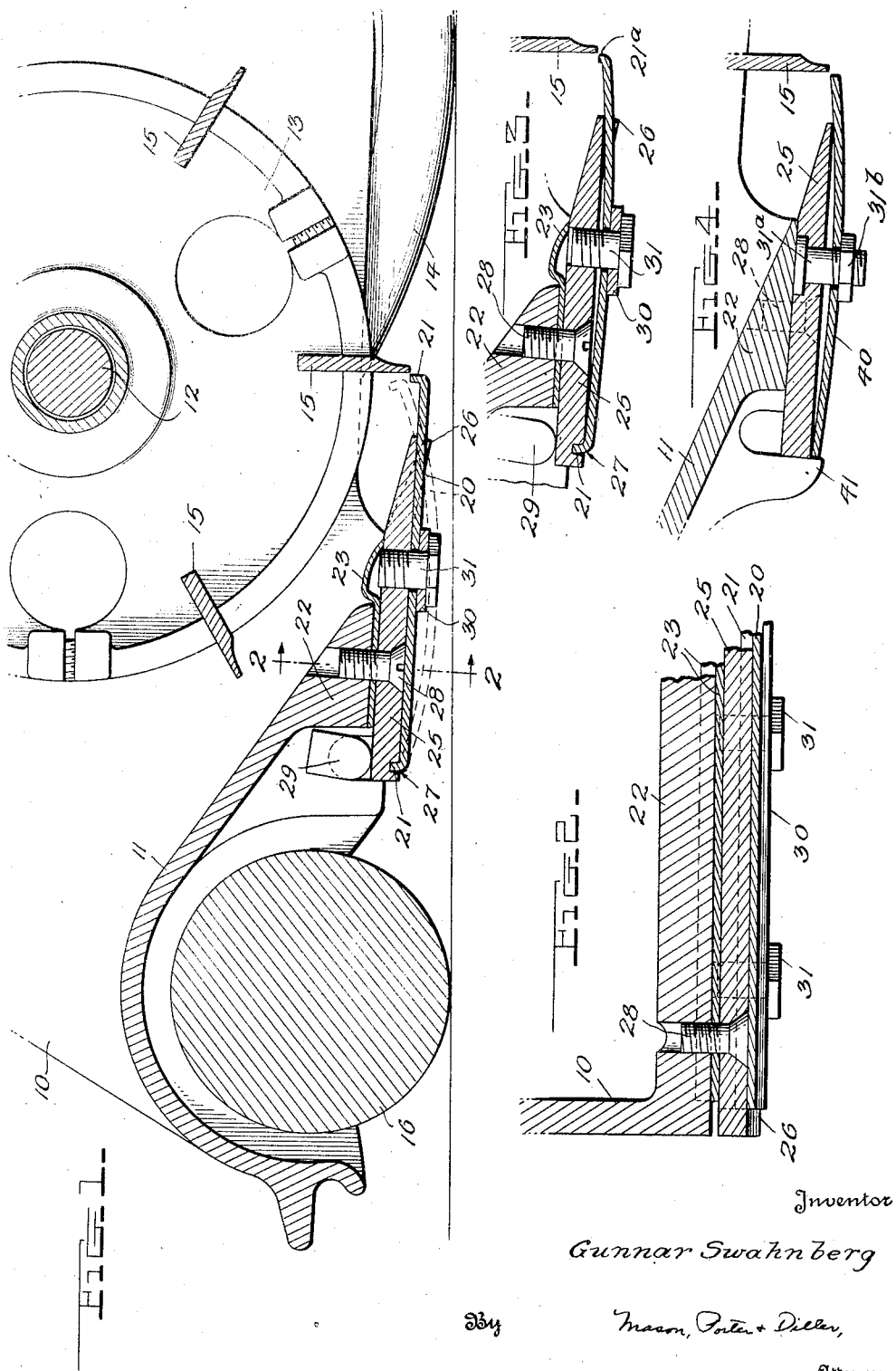
Inventor
Gunnar Swahnberg
By Mason, Porter & Diller,
Attorneys Patented Dec. 6, 1949

2,490,169

UNITED STATES PATENT OFFICE 2,490,169

KNIFE STRUCTURE FOR LAWN MOWERS AND THE LIKE

Gunnar Swahnberg, Keene, N. H.

Application April 12, 1945, Serial No. 587,853

4 Claims. (Cl. 56—249)

This invention relates to the structures of stationary knife devices for lawn mower and like cutting instruments.

A feature of the invention is a stationary knife blade which is normally transversely bowed or arched and which is held in a flattened condition upon initial use, with an adjusted return toward arched position as the blades become worn.

Another feature is a stationary knife structure for supporting a blade which is normally transversely bowed or arched, with means for effecting adjustment for wear by employment of the resiliency of the blade itself.

A further feature is a stationary knife structure including a normally transversely bowed or arched blade of resilient material and having edge ribs providing cutting surfaces, and a support cooperative with one such rib for positioning the blade.

Another feature is a stationary knife blade and support therefor, with arrangement and attachment of the parts whereby replacement and adjustment for wear may be quickly and easily effected.

With these and other features as objects in view, as will appear in this disclosure and claims, illustrative forms of practicing the invention are shown on the accompanying drawings, in which:

Figure 1 is an upright section radially through the cage assembly of a lawn mower.

Figure 2 is an upright section, substantially on line 2—2 of Figure 1, showing a part of the blade assembly.

Figure 3 is a view of the blade and support, corresponding to a part of Figure 1, but with the blade in a different position of adjustment.

Figure 4 is a view corresponding to Figure 3, of a modified construction.

In these drawings, the lawn mower body is shown as having a rigid frame with the side members 10 and the floor 11, which are fixedly secured together. The shaft 12 for the cage spiders 13 is mounted on the frame and can be rotated in the usual manner from the ground wheels 14 as the lawn mower is trundled over the ground. The cage spiders 13 support the rotating knives 15. A roller 16 is supported from the frame. These parts are illustrative only, and their particular shape and construction forms no part of the present invention.

The stationary knife blade 20 in its preferred normal or unstressed form, as sold for replacement, is of resilient material of uniform width, is transversely bowed or arched (dotted lines in Figure 1) and has the upturned ribs 21 at its edges, the ribs being at the concave side, said blade having straight and parallel edges and apertures between said edges.

The blade 20 is supported from the thickened section 22 of the floor 11. A deflector plate 23 formed from thin sheet metal extends between the side members.

The shoe member 25 is preferably of hard steel and has a length greater than the length of the blade 20, with its ends having downturned ears 26 at the front corners, which engage the ends of the blade 20 and prevent endwise movement thereof. The shoe member 25 also has a groove 27 in its lower face and extending transversely of the frame to receive the rear rib 21 of the knife, and thereby is effective to hold the knife with its front or cutting edge in a true position parallel to the axis of the shaft 12. The front edge of the shoe member is spaced rearward from the front or operative cutting edge of the blade 20, and provides a fulcrum for upward and downward movement of this front edge during adjustment. Apertures are provided in the shoe member 25 rearward of its front edge for receiving the screws 28 which have countersunk heads and which are threaded into the thickened floor section 22 for rigid and accurately located assembly of the shoe member upon the body of the lawn mower. In the illustrated form, this assemblage also provides a clamp for holding the deflector 23 in position and also supporting the yoke 29 of the roller assembly.

A separate cleat 30 is placed beneath the knife 20, and the screws 31 pass through apertures of this cleat and the blade and are threaded into the shoe member 25.

When the parts are being initially assembled, the shoe member 25 and deflector 23 are fastened securely by the screws 28. A blade 20, in its bowed normal condition, is then placed with its rearward rib 21 engaged in the groove 27, the cleat 30 is positioned, and screws 31 introduced and tightened until the upwardly extending forward cutting rib 21 is presented for cutting engagement with the rotating knives. This leads to a positioning of parts (Figure 1) which in a new mower brings the stationary knife into an essentially flat condition. As the rotating cage turns, its knives successively cooperate with stationary blade to effect the cutting, therewith producing a rearward thrust upon the knife, which is exerted in a direction essentially coplanar with the blade, and transmitted to the rear wall of the groove 27 essentially independently of the securing screws.

As wear or redressing reduces the effective radius of the rotating blades and the height of the cutting rib 21 of the stationary blade, compensating adjustment can be effected by unscrewing the screws 31 until the proper cutting engagement is again attained, by the effect of the resilient return of the blade 20 toward its normal bowed condition. It will be noted that the front edge of the shoe member 25 provides a fulcrum, about which the front portion of the blade 20 turns, so that the cutting edge moves upward during such adjustment, as indicated in Figure 3.

When the blade 20 becomes excessively worn, the screws 31 are removed, and the blade turned end-for-end, so that the rib 21 which previously was in the groove 27 is now at the front, and adjustments are accomplished as before. This reversal is preferably accomplished before the cutting rib is totally worn away, a condition which can be assured by selection of the normal bow in the blade and the dimensions of the shoe member 25.

In the normal use of a lawn mower or other device having a multiplicity of moving blades cooperating with a single stationary blade, the wear upon the stationary blade is much greater than that upon the individual moving blades. Hence, the moving blades are yet in good condition when both cutting ribs of the stationary blade 20 have been worn out. In such case, the old blade is removed and a new blade 20 introduced and adjusted as above.

In the modified form of Figure 4, the stationary blade 40 has no cutting ribs at its edges, but has the normal bowed form of a very shallow trough. In this construction, the rear edge is retained, against movement under the reaction of cutting, by abutting against a fixed shoulder 41 shown as a part of the frame. This modified form also has a change by omitting the deflector 23, and extending the thickened section 22 to perform the function of a smooth guide for movement of the clippings. The shoe member 25 is fastened to the section 22 of screws 28, while the bolts 31a are pressed into the shoe so that they are normally immovable. These bolts 31a extend through the apertures of the blade 40, and receive the nuts 31b which effect the adjustment as before.

The illustrative forms are not restrictive, and it will be understood that the invention can be practiced in many ways within the scope of the appended claims.

I claim:

1. A cutting device including a knife support, a knife blade of resilient material and of normally transversely bowed shape, said blade having two substantially parallel edges of which one is positioned for cutting and the other is in non-cutting position, said support having means for engaging and locating the non-cutting edge of said blade and thereby effective to determine and locate the position of said cutting edge relative to said support and also providing a fulcrum spaced from the cutting edge of the blade, and means for drawing the center of width of the blade toward said support from said transversely bowed shape into a flattened condition against the resilience of the blade material whereby to bring the cutting edge into adjusted position for cutting.

2. A cutting device including a rigid frame, a stationary blade of resilient material and of uniform width and of normally transversely bowed shape and having a rear non-cutting edge and a front cutting edge, the frame having a transversely extending part with a wall engaging said rear non-cutting edge for locating said blade on the frame and for resisting cutting efforts upon the blade substantially in the plane thereof, said frame having a fulcrum spaced rearward from the cutting edge, and blade securing means engaged with the blade rearward of said fulcrum for drawing the blade from said transversely bowed shape into a selected more flattened condition against the resiliency of the blade material whereby to adjust the cutting edge.

3. A stationary knife structure for a lawn mower having a rigid frame, comprising a shoe member fixedly and immovably secured to the frame and extending transversely from side to side thereof, said shoe member having on its lower face a groove extending transversely of said frame, a stationary blade of resilient material of uniform width and of normally bowed cross-section and having ribs for providing cutting edges, said ribs being positioned at the concave face of the bowed shape, the front rib being directed upwardly and positioned in front of the front edge of the shoe member, the rear rib being positioned in said groove and bearing against the rear wall thereof so that rearward efforts along the surface of the blade are transmitted from the rear edge thereof to said shoe, and threaded clamping and adjusting devices passing through apertures of the blade and engaged in said shoe member to draw the blade toward the shoe member into a more flattened condition against the resilience of the blade material, the shoe member having its front edge spaced from the cutting edge of the blade so that the cutting edge of said front rib is moved upward and downward when said threaded devices are adjusted.

4. A double-edged lawn mower knife blade of resilient material in the form of a strip of essentially uniform width and having when free of strain a transversely bowed shape with straight and parallel edges, and having apertures between its edges for receiving clamping devices effective for pressing the blade into a more flattened form, said blade having upstanding ribs at its edges to provide cutting edges, said ribs being positioned at the concave face of the bowed shape.

GUNNAR SWAHNBERG.

REFERENCES CITED

The following references are of record in the file of this patent:

UNITED STATES PATENTS

| Number | Name | Date |
| --- | --- | --- |
| 817,157 | Coldwell | Apr. 10, 1906 |
| 1,516,419 | Case | Nov. 18, 1924 |
| 1,971,985 | Laird | Aug. 28, 1934 |
| 2,056,408 | Ohmer | Oct. 6, 1936 |
| 2,213,062 | Brandenthaler | Aug. 27, 1940 |